United States Patent [19]

Schmidt

[11] Patent Number: 5,051,564

[45] Date of Patent: Sep. 24, 1991

[54] METHOD AND APPARATUS FOR CONTROLLING A MACHINE

[76] Inventor: Alfred C. Schmidt, 201 Branch Brook Rd., Wilton, Conn. 06897

[21] Appl. No.: 292,847

[22] Filed: Jan. 3, 1989

[51] Int. Cl.[5] .......................... G06F 7/06; G03G 15/00

[52] U.S. Cl. .................................... 235/381; 235/382; 364/464.02

[58] Field of Search ............... 235/375, 380, 381, 382, 235/382.5; 364/464.02, 466; 340/825.31-825.34; 355/201, 202

[56] References Cited

U.S. PATENT DOCUMENTS

| | | | |
|---|---|---|---|
| 4,531,826 | 7/1985 | Stoughton et al. | 355/201 |
| 4,629,871 | 12/1986 | Scribner et al. | 235/382.5 X |
| 4,853,523 | 8/1989 | Talmadge | 364/464.02 X |
| 4,858,138 | 8/1989 | Talmadge | 364/464.02 X |

FOREIGN PATENT DOCUMENTS

| | | |
|---|---|---|
| 57-23961 | 2/1982 | Japan . |
| 57-70554 | 5/1982 | Japan . |
| 62-96968 | 5/1987 | Japan . |

*Primary Examiner*—Stuart S. Levy

*Assistant Examiner*—Steven M. duBois

*Attorney, Agent, or Firm*—Robert H. Whisker; Melvin J. Scolnick; David E. Pitchenik

[57] ABSTRACT

A machine control and accounting arrangement for controlling operation of a machine includes a secure housing, an electronic control system within the housing, and first and second interfaces coupled to the control system to permit communication between the control system and devices external of said housing. The first interface comprising an arrangement for applying a count signal to the control system. The second interface comprising an arrangement for applying encrypted control signals to the control system. The control system includes a first register for storing a current count corresponding to the count signal, a second register for storing an authorization count, an arrangement for applying an enable signal to the first interface when the count of the first register does not exceed the count of the second register, a decoding arrangement for decrypting control signals applied thereto to produce a decrypted signal, and an arrangement responsive to a valid decrypted signal for modifying the count in the second register.

10 Claims, 2 Drawing Sheets

METHOD AND APPARATUS FOR CONTROLLING A MACHINE

BACKGROUND OF THE INVENTION

Figure 1:
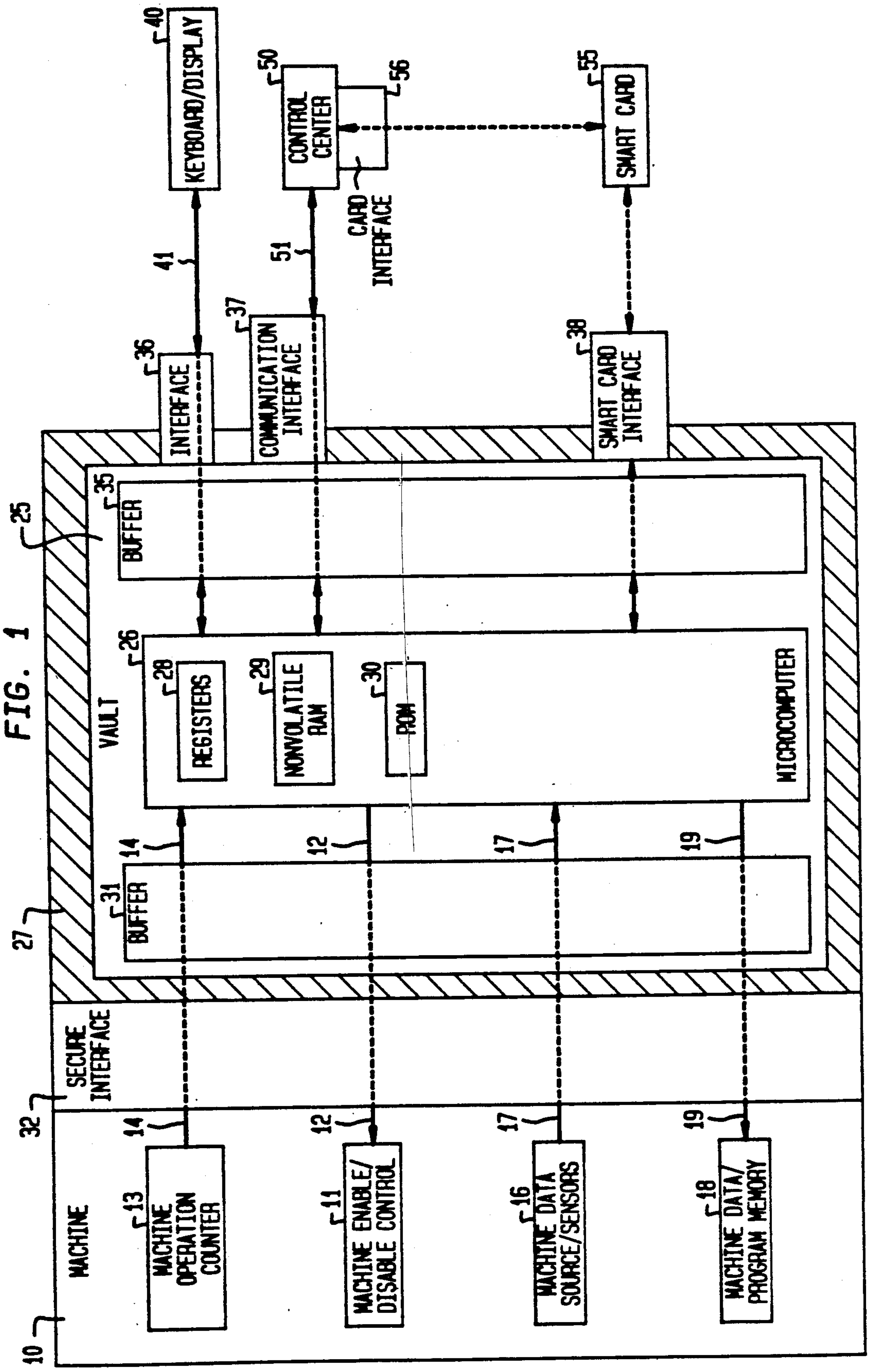

This invention relates to a machine control and accounting arrangement and method, for controlling the operation of a machine and for enabling accounting of the operation thereof.

It is frequently necessary for the owner of equipment, such as material processing or handling equipment, to rent the equipment to a user, with the fees for use of the equipment being dependent upon the usage of the equipment. If such renting arrangements are to be based, for example, on prepayment by the user for the use of the equipment for a predetermined extent of usage, or for a predetermined time interval, it is necessary for the owner to monitor the equipment usage, and it may be necessary to provide a dedicated control system in the equipment for inhibiting its usage beyond that for which prepayments have been made.

SUMMARY OF THE INVENTION

The present invention is directed to the provision of a solution to the problem of enabling usage of equipment to a predetermined extent, in a simple and secure manner that is readily adaptable to a large variety of devices.

In accordance with the invention, a "vault" or control system is provided, that may be of a standardized design for economy of manufacture and use, the control system being readily adaptable to be connected to monitor and control many different types of equipment in a secure manner, and further being adaptable to both remote and local control.

Briefly stated, a machine control and accounting arrangement in accordance with the invention for controlling operation of a machine comprises a secure housing, an electronic control system within the housing, and first and second interfaces coupled to the control system to permit communication between the control system and devices external of the housing. The first interface comprises means for applying a count signal to the control system, and the second interface comprising means for applying encrypted control signals to the control system. The control system comprising first register means for storing a current count corresponding to the count signal, a second register for storing an authorization count, means for applying an enable signal to the first interface when the count of the first register means does not exceed the count of the second register means, means for decrypting control signals applied thereto to produce a decrypted signal, and means responsive to a valid decrypted signal for modifying the count in the second register.

It will be understood that the terms "encrypted" and "decrypted", as employed herein, include not only the actual encryption and decryption of control signals, but also to the equivalent technique of gaining access to the control system by the use of a password, in which case the control signals themselves may not, in some cases, need be "encrypted".

The control system, or "vault", is an electronic control system housed in a secure housing and adapted to receive and decode an encrypted input, and, in response thereto, to perform a determined task such as producing an output dependent upon the encrypted input. Devices of this type have been employed in the past, for example, in the control of the dispensing of postage in a postage meter, as disclosed, for example, in U.S. Pat. No. 4,310,507.

BRIEF FIGURE DESCRIPTION

Figure 2:
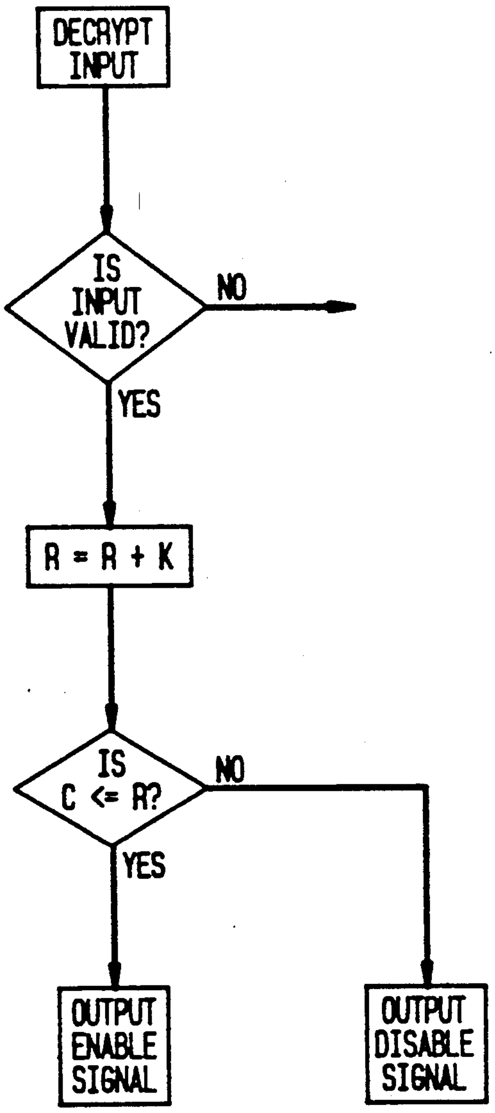

In order that the invention may be more clearly understood, it will now be disclosed in greater detail with reference to the accompanying drawings, wherein:

FIG. 1 is a block diagram of a machine control and accounting system in accordance with one embodiment of the invention; and FIG. 2 is a flow diagram in accordance with the invention.

DETAILED DISCLOSURE OF THE INVENTION

Referring now to the drawings, and more in particular to FIG. 1, therein is illustrated a machine control and accounting system in accordance with the invention, for controlling and accounting for the operation of a machine 10. As will be discussed, the machine 10 may be any of a number of different types of machines, it being essential, however, in accordance with the invention, that the machine be provided with a control 11 enabling the machine to be enabled or disabled. The enable/disable control 11 is preferably electrically operable by a signal on enable line 12, for example comprising an electronic switch or other electrically operated switch, so that operability of the machine can be controlled by signals on the line 12. In addition, the machine 10 incorporates an operation counter 13. The operation counter 13 outputs electrical signals on line 14 corresponding to operations of the machine. The counter 13 may for example comprise a BCD switch mechanically controlled by a rotary element in the machine, to count operations or cycles of operation of the machine. Alternatively, the counter may provide a count corresponding to time of operation of the machine, or a more complex function including functions of machine use and environmental conditions.

In more complex control arrangements in accordance with the invention, the machine may have physical sensors 16 or other data sources, to enable the output of data concerned with the machine operation on a line 17. The device 16 may also or alternatively comprise an arrangement capable of full protocol exchange with the vault 25, and it may hence comprise a source of other types of information than sensor information, such as accounting information and information that is read on demand from a memory withing the machine 10. The machine 10 may further include a memory 18 for receiving on line 19 data or programs for controlling the operation of the machine. Data and/or program control received on the line 19 may alternatively be directly employed in the operation of the machine. The interface 18, 19 may also or alternatively be adapted to receive vault information that is part of a protocol exchange.

In accordance with the present invention, a "vault" 25 is provided for the control and accounting of operations of the machine 10. As employed herein, the term "vault" refers to an electronic control system 26 housed in a mechanically and electronically secure housing 27, the control system being adapted to receive and decode an encrypted input, and, in response thereto, to perform one or more determined tasks, such as producing an output dependent on the encrypted input for controlling the machine, or for outputting information concerning the operation of the machine. Devices of this type have been employed in the past for control of and dispensing of postage by a postage meter, as disclosed for example in U.S. Pat. No. 4,310,507.

The control system 26 may comprise a microcomputer, incorporating therein for example registers 28 and nonvolatile memory 29 for the storage of data and variable operating parameters, and read-only memory 30 for the storage of programs, encryption parameters, and constants. The vault may be provided with a buffer 31 enabling coupling of the lines 12, 14, 17, and 19 to the microcomputer by way of a secure interface 32, as well as a buffer 35 for coupling the microcomputer to control interfaces 36, 37, and 38.

While the security of the interface 32, as above discussed, may comprise physical security achieved, for example, by physically locking the vault to the machine, the security may be achieved alternatively or in addition by the provision of a logical interface. Thus, for example, the machine and the vault may be provided with means for enabling a series of information or other exchanges, such that the machine and vault know that they are connected to compatible equipment. Such exchanges may be effected without the exchange of data, and without the use of keys.

The interface 36 enables communication between the microcomputer 26 in the vault and a conventional keyboard/display unit 40 external of the secure housing 27, via lines 41. The keyboard/display unit 40 is preferably located physically at the vault, or near the vault, and it is not necessary to provide for a secure interconnection between the vault and the keyboard/display 40.

The interface 37 is a communication interface, for example enabling communication employing the RS232 protocol, with an external control center 50, for example via telephone lines 51. The control center 50, which will be described in greater detail in the following paragraphs, stores encryption data corresponding to that stored in the control system 26, so that some or all of the signals pass between the control center 50 and the microcomputer 26 may be encrypted.

The interface 38 is a card entry device, such as a smart card interface, enabling transfer of data from a smart card 55 to or from the microcomputer 26 upon insertion of the card for example in a slot in the interface. The card 55 may receive authorization or other data from the control center, and pass data stored thereon to the control center, by way of a conventional card interface 56 at the control center. The smart card system may be of any conventionally known system, such systems being described, for example, in "The Smart Card", Sarah Brown and Ronald Brown, published by Post-News, Somerset, England, 1986.

In one example of the invention, the machine 10 may be an oil pump, for use in the oil fields, and owned by an entity in the business of leasing such pumps. The owner desires that the lease of the pump to a user be based upon a predetermined number of operating cycles of the pump (e.g., the number of times the pump goes up and down), and that the user be enabled to employ the pump for such predetermined number of operations only upon prepayment. In this example, initially consider that the owner of the pump is able to enable pump authorization at the vault by the use of the keyboard/display unit 40.

In this example, the owner is aware of the encryption seed stored in the microcomputer 26. The encryption seed is preferably variable, for example changing in accordance with a given algorithm upon each use, and the user may be provided with a table or computer in order to be continually aware of necessary encryption data for accessing the microcomputer 26 employing the keyboard/display unit 40. In this example, as illustrated in FIG. 2, the microcomputer decrypts the input signals received by way of the interace 36, and test these signals for validity. Typical encryption and decryption methods and apparatus that may be employed are disclosed, for example, in U.S. Pat. No. 3,978,457 and U.S. Pat. No. 4,097,923, assigned to the assignee of the present application.

Upon receipt of a valid input, a register value R, stored in one of the registers 28, is incremented by a predetermined amount K, thereby increasing the authorized number of cycles of the operation of the pump by K. During operation of the pump, the program of the microcomputer 26 continually compares the count C of the counter 14 with the count R of the register in the microcomputer. If C is equal to or less than R [$C \leqq R$], then the microcomputer outputs an enable signal on the line 12 to continue enabling the pump. If, on the other hand, this test is not met, the microcomputer outputs a disable signal on the line 12, to inhibit further operation of the pump by the user.

Thus, in accordance with the invention, the owner of the pump is enabled, in a simple manner, to permit the user to employ the pump for a prepaid number of operating cycles. The program of the microcomputer may further permit the operator of the keyboard to access the counts of the counter 13 and registers 28 for display, in order to enable monitoring of the use of the pump. Such monitoring may require the entry of predetermined access codes in the keyboard, if desired.

Alternatively, the vault can be used strictly for collection of accounting information. Thus, in the event that the owner does not demand prepayment for use of the machine, the machine 10 may not be shut off when a certain number of cycles, etc., is reached. The vault may be used in this case as a secure repository of information that can be transferred from the machine on a pre-set basis, for example hourly or at the end of a certain number of cycles.

Control of the microcomputer may be effected remotely in a similar manner, employing the control center 50 intercoupled with the microcomputer by way of the communication interface. Similarly, the registers in the microcomputer may be updated by means of a smart card 55, for enabling additional use of the pump by the user. The use of smart cards for updating registers in secure systems is disclosed, for example, in U.S. Pat. Nos. 4,258,252; 4,218,011; and 4,249,071. Remote register resetting via telephone lines or the like is disclosed, for example, in U.S. Pat. No. 3,596,247.

In more complex control systems, it may be desirable to control the operation of the machine as a function that is more complex than merely the counting of machine operations. It is for this purpose that a data source 16 be provided in or on the machine. For example, temperature sensors in the device 16 enable signaling the microcomputer 26 of the environmental temperature of the machine. Assuming, in the above example, that the authorized use of the pump be a function of temperature, for example to enable the user for a lower number of cycles with increased heat, the microcomputer may contain a program in read-only memory for adjusting the authorized count R in the registers 28 as a function of temperature. In a further modification, such a program may be provided in the nonvolatile memory 29, to enable it to be modified for example on the basis of valid modification data received from the control center 50 or the smart card 55. As an alternative to modifying the program in the microcomputer, external valid programing steps or data may be entered into a memory 18 in the machine under the control of the microcomputer 26. Such data or program memory in the machine may be employed, in more complex machines, for controlling further operations in the machine.

For example, the data signal out from the microcomputer may be employed to select a speed at which the motor runs, dependent upon the temperature sensed by the sensor arrangement 16.

The machine 10 may be any of a number of types of devices, such as, for example, switches, meters, counters, etc. It may be a device for controlling physical processes, or it may be a service device such as a copy machine, facsimile machine, compressor, or generator. Further, the machine may constitute a device dispensing items of symbolic value, such as stamps, coupons, tickets, or money.

The vault, which may employ circuitry similar to that disclosed, for example, in U.S. Pat. No. 4,301,507, must be designed to enable its interconnection to the machine in mechanically and or logically secure manner so that, for example, it cannot be electrically disconnected from the machine without leaving evidence that such a separation had been effected. The vault must further be capable, at a minimum, of receiving a counting signal from a machine for internal comparison with an authorized count, and means for producing an output signal to the machine enabling or disabling operation thereof. The program of the machine must provide facility for comparing the count received from the machine with a count stored in a nonvolatile register.

While the invention has been disclosed and described with reference to a limited number of embodiments, it will be apparent that variations and modifications may be made therein, and it is therefore intended in the following claims to cover each such variation and modification as falls within the true spirit and scope of the invention.

What is claimed is:

1. A machine control and accounting arrangement for controlling the usage of a machine external to said arrangement, comprising:

a) a secure housing;

b) a control system within said housing;

c) first and second interfaces coupled to said control system to permit communication between said control system and devices external of said housing;

d) said first interface comprising means for transmitting data representative of operational characteristics of said machine, said data including a count signal, from said machine to said control system in a secure manner, and means for transmitting an enable signal from said control system to said machine in a secure manner;

e) said second interface comprising means for transmitting control signals from a device external to said housing to said control system; and, f) said control system further comprising:

f1) means responsive to said count signal for comparing a cumulative function of the count signal with a stored authorization count, and only if said comparison is satisfied transmitting said enable signal to said machine to enable operation of said machine;

f2) means responsive to said control signals for decrypting said control signals to produce a decrypted signal and for modifying said authorization count in response to a valid decryption signal; and f3) means responsive to said data for modifying future operational characteristics of said machine as a function of said data.

2. A machine control and accounting arrangement as described in claim 1 wherein said cumulative function of said count signal equals the cumulative total of cycles of operation for said machine.

3. A machine control and accounting arrangement as described in claim 1 wherein said secure manner of transmission of said count signal and said enable signal comprises a preliminary exchange in accordance with a predetermined logical interface such that said machine and said arrangement establish that interconnection to compatible equipment has been made.

4. An arrangement as described in claim 1 wherein said means for modifying future operational characteristics further comprises means for modifying said comparison.

5. An arrangement as described in claim 1 wherein said means for modifying future operational characteristics further comprises means for entering programming steps or data into said machine.

6. A method of controlling the usage of a machine comprising the steps of:

a) providing an authorization count;

b) receiving data, including a count signal, representative of operational characteristics of said machine;

c) computing a cumulative function of said count signal;

d) modifying future operational characteristics of said machine as a function of said data; and e) comparing said cumulative function to said authorization count and providing an enable signal to said machine if and only if said comparison is satisfied.

7. A method as described in claim 6 comprising the further steps of:

a) receiving encrypted control signals;

b) decrypting said control signals to provide a decrypted signal, and modifying said authorization count in response to said valid decrypted signal.

8. A method as described in claim 6 wherein said predetermined cumulative function equals the cumulative total of cycles of operation of said machine.

9. A method as described in claim 6 wherein step d) further comprises the step of modifying said comparison.

10. A method as described in claim 6 wherein step d) further comprises the step of entering programming steps or data into said machine.

* * * * *